(12) United States Patent
Lin

(10) Patent No.: US 9,246,968 B2
(45) Date of Patent: Jan. 26, 2016

(54) APPARATUS AND METHOD FOR SHARING STREAMING MEDIA

(71) Applicant: HON HAI PRECISION INDUSTRY CO., LTD., New Taipei (TW)

(72) Inventor: Yen-Hsin Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 158 days.

(21) Appl. No.: 14/079,631

(22) Filed: Nov. 13, 2013

(65) Prior Publication Data

US 2014/0164635 A1    Jun. 12, 2014

(30) Foreign Application Priority Data

Dec. 10, 2012    (TW) .............................. 101146471 A

(51) Int. Cl.
  *G06F 15/16*    (2006.01)
  *H04L 29/06*    (2006.01)

(52) U.S. Cl.
  CPC ................ *H04L 65/60* (2013.01); *H04L 63/06* (2013.01); *H04L 65/1069* (2013.01)

(58) Field of Classification Search
  USPC .................................................. 709/229, 223
  See application file for complete search history.

(56) References Cited

U.S. PATENT DOCUMENTS

| 7,010,492 | B1 | 3/2006 | Bassett et al. |
| 2002/0049852 | A1 | 4/2002 | Lee et al. |
| 2004/0071088 | A1 | 4/2004 | Curcio et al. |
| 2008/0140849 | A1* | 6/2008 | Collazo .......................... 709/229 |
| 2009/0069000 | A1* | 3/2009 | Kindberg et al. ............. 709/217 |
| 2009/0157876 | A1* | 6/2009 | Lection .......................... 709/225 |
| 2009/0327244 | A1* | 12/2009 | Rizal ............................. 709/204 |
| 2011/0101086 | A1* | 5/2011 | Yach ............................. 235/375 |
| 2012/0042351 | A1* | 2/2012 | Wang et al. ................... 725/116 |
| 2013/0073584 | A1* | 3/2013 | Kuper et al. ................. 707/769 |

FOREIGN PATENT DOCUMENTS

| CA | 2011159558 A1 | 12/2011 |
| TW | 508951 | 11/2002 |
| TW | 538354 | 6/2003 |
| TW | I248740 | 2/2006 |
| TW | I354494 | 12/2011 |

* cited by examiner

*Primary Examiner* — Philip B Tran

(74) *Attorney, Agent, or Firm* — Novak Druce Connolly Bove + Quigg LLP

(57) ABSTRACT

A method for sharing streaming media between a plurality of media providing devices and a media requesting device includes the media requesting device sending a request message to each of the media providing devices. Each of the media providing devices generates and displays a verification image. The media requesting device captures the verification image of one of the media providing devices and extracts a verification code from the captured verification image. The verification code is sent to each of the media providing devices for verification. When the verification code passes a verification of a corresponding media providing device, a media sharing connection between the media requesting device and the corresponding media providing device is established.

16 Claims, 8 Drawing Sheets

APPARATUS AND METHOD FOR SHARING STREAMING MEDIA

BACKGROUND

1. Technical Field

Embodiments of the present disclosure generally relate to media sharing technologies used in home media networks, and particularly to an apparatus and method for sharing streaming media.

2. Description of Related Art

Media sharing technologies are widely used in home media networks. When a user wants to share streaming media among different devices, the user needs to manually establish a media sharing connection between the different devices. However, when the user wants to establish the media sharing connection, the user needs to know information (e.g., device name or device ID) of each of the devices, which is inconvenient. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one." The reference "a plurality of" means "at least two."

Figure 1:
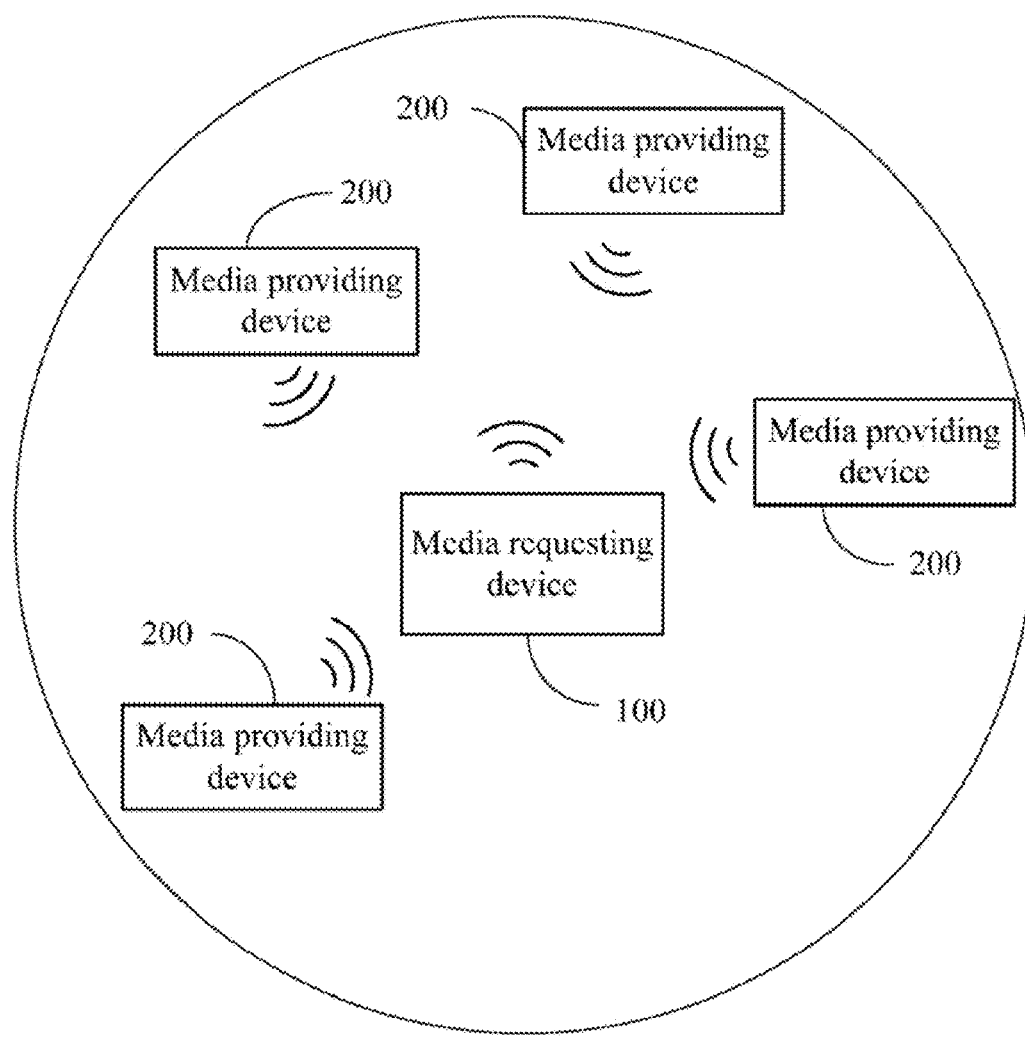
FIG. 1 is a schematic view of a media requesting device communicating with a plurality of media providing devices.

FIG. 1 shows a media requesting device 100 in communication with a plurality of media providing devices 200. The media requesting device 100 may communicate with the media providing devices 200 via wireless connections, such as BLUETOOTH® and WIFI®. The media requesting device 100 is configured to request the media providing devices 200 to share streaming media. For example, the streaming media may be audio streaming, video streaming, text streaming, and image streaming, which are played by the media providing devices 200. The media requesting device 100 may be a smart phone, a digital media player, a digital television, or a personal computer, for example. Each of the media providing devices 200 can be the same device as the media requesting device 100. In one embodiment, the media requesting device 100 is a portable device, such as a smart phone, and each media providing device 200 can be a desktop device, such as a personal computer.

Figure 2:
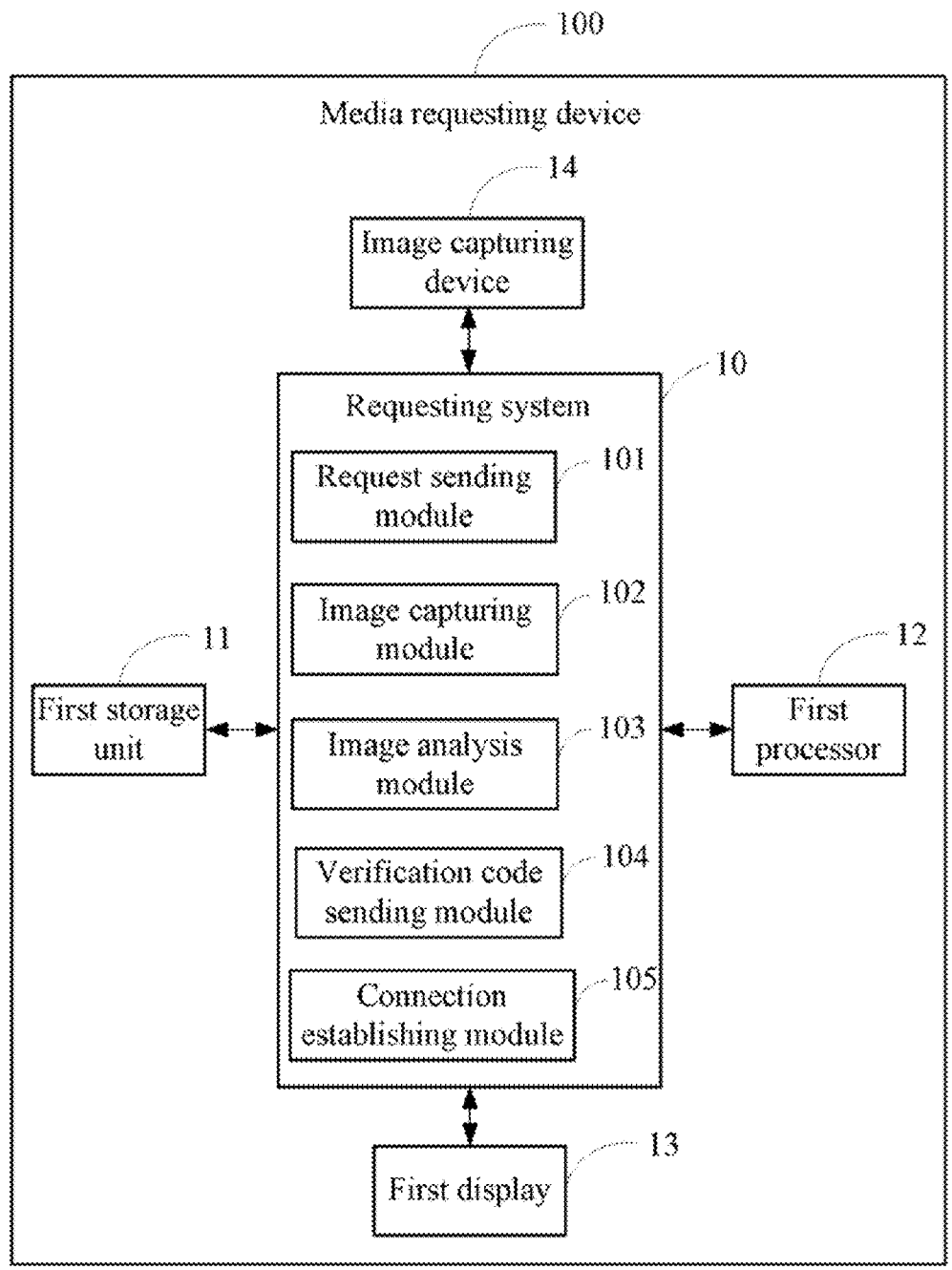
FIG. 2 is a schematic block diagram of the media requesting device of FIG. 1.

FIG. 2 is a schematic block diagram of the media requesting device 100. The media requesting device 100 includes a requesting system 10, a first storage unit 11, a first processor 12, a first display 13, and an image capturing device 14. The requesting system 10 includes a request sending module 101, an image capturing module 102, an image analysis module 103, a verification code sending module 104, and a connection establishing module 105. The modules 101-105 include computerized codes in the form of one or more programs that are stored in the first storage unit 11 or other storage mediums of the media requesting device 100. The computerized codes include computer-readable program codes (instructions) that are executed by the first processor 12 to provide functions for the media requesting device 100. The first storage unit 11 may be a cache or a dedicated memory, such as an erasable programmable read only memory (EPROM), a hard disk drive (HDD), or a flash memory.

Figure 3:
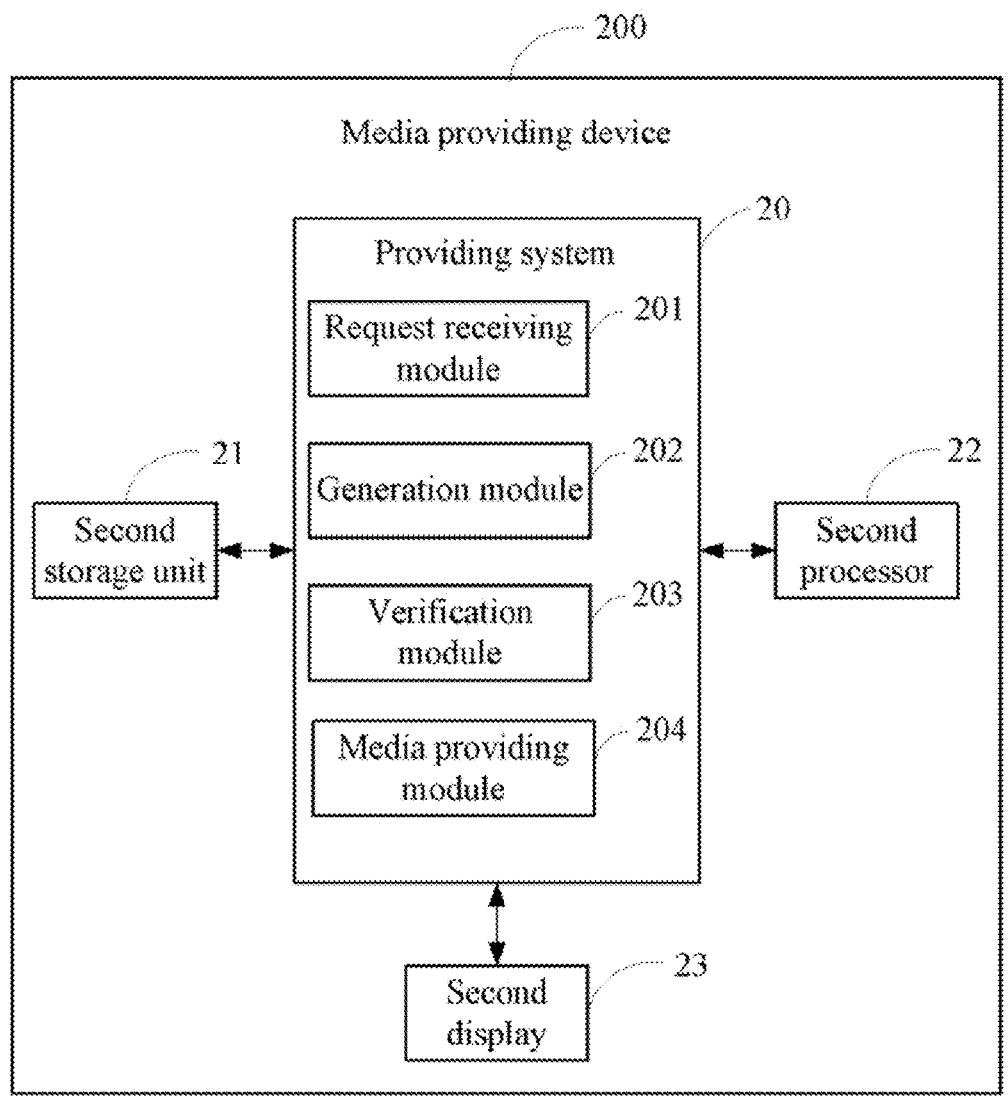
FIG. 3 is a schematic block diagram of the media providing device of FIG. 1.
Figure 4:
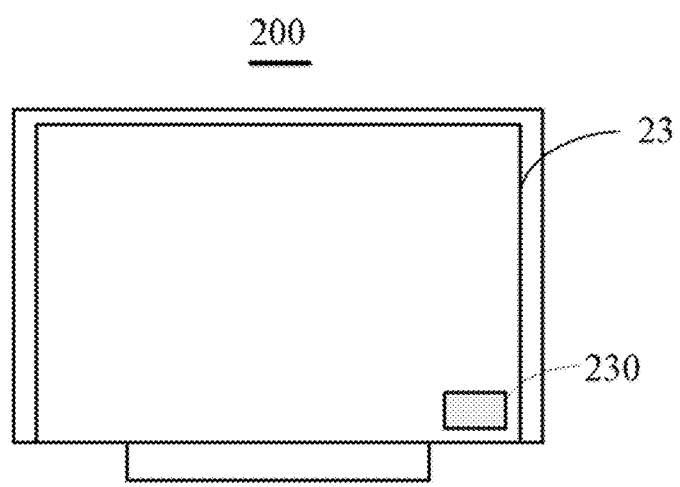
FIG. 4 is a schematic view of a media providing device including an identification area.

FIG. 3 is a schematic block diagram of the media providing device 200. The media providing device 200 includes a providing system 20, a second storage unit 21, a second processor 22, and a second display 23. In one embodiment, the providing system 20 is configured to share streaming media with the media requesting device 100. The providing system 20 includes a request receiving module 201, a generation module 202, a verification module 203, and a media providing module 204. The modules 201-204 include computerized codes in the form of one or more programs that are stored in the second storage unit 21 or other storage mediums of the media providing device 200. The computerized codes include computer-readable program codes (instructions) that are executed by the second processor 22 to provide functions for the media providing device 200. The second storage unit 21 may be a cache or a dedicated memory, such as an erasable programmable read only memory (EPROM), a hard disk drive (HDD), or a flash memory.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 5:
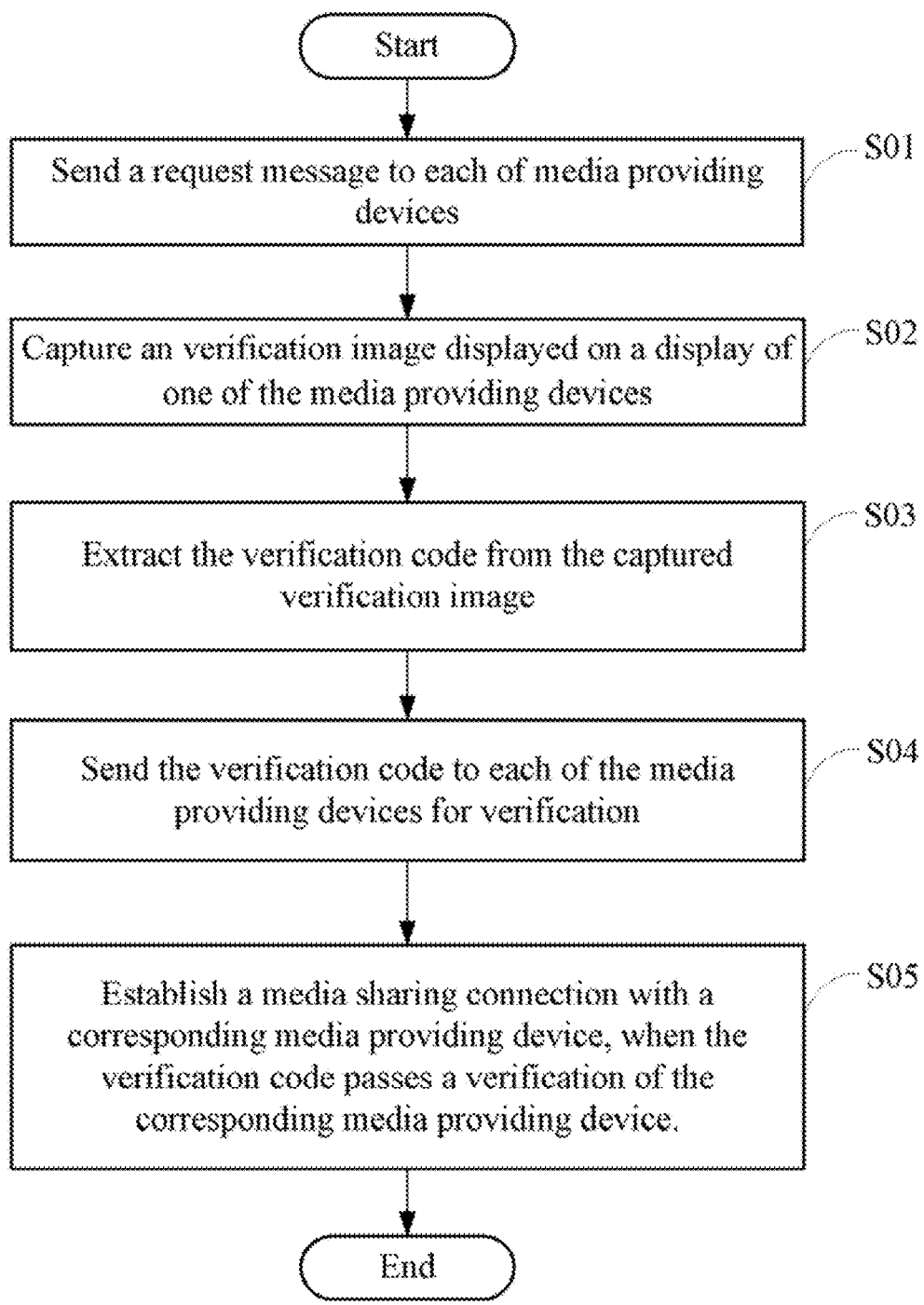
FIG. 5 is a flowchart of a method for requesting one of the media providing devices to share streaming media with the media requesting device.

FIG. 5 is flowchart of one embodiment of a method for the media requesting device 100 to request the media providing devices 200 to share streaming media. Depending on the embodiment, additional steps may be added, others removed, and the ordering of the steps may be changed.

In step S01, the request sending module 101 sends a request message to each of the media providing devices 200 to request the media providing devices 200 to share streaming media with the media requesting device 100.

In step S02, the image capturing module 102 controls the image capturing device 14 to capture a verification image displayed on the second display 23 of one of the media providing devices 200. The verification image indicates that the request message has been received. In one embodiment, each of the media providing devices 200 generates a verification image in response to receiving the request message. The second display 23 of each media providing device 200 includes an identification area 230 to display the verification image therein.

Figure 6:
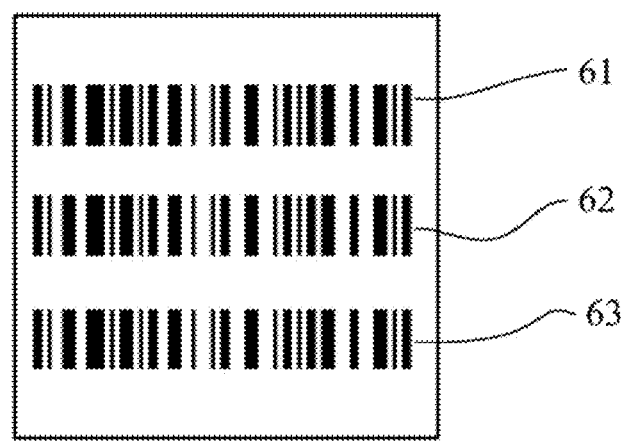
FIG. 6 shows one embodiment of a schematic view of a verification image.
Figure 7:
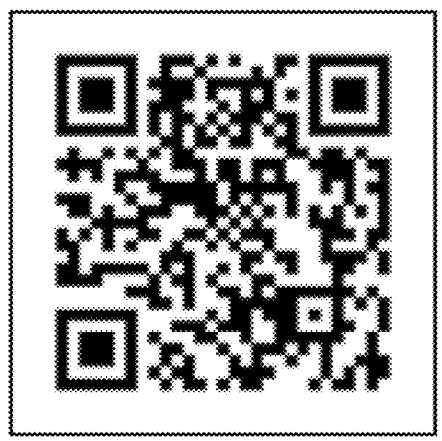
FIG. 7 shows another embodiment of a schematic vies of the verification image.

In FIG. 6, in one embodiment, the verification image includes a first barcode 61 having an indication code, a second barcode 62 having a verification code, and a third barcode 63 having an encryption code. The indication code is a predetermined code indicating that the request message has been received by the media providing devices 200 and that the request message is used to request to share the streaming media. The verification code may be a random code dynamically generated by the media providing device 200. The encryption code may be a preset password, which is used to encrypt and decrypt streaming media shared between the media requesting device 100 and the media providing device 200. The verification image is displayed in the identification area 230 of the second display 23 of each media providing device 200 for a predetermined period of time (e.g., 30 seconds) after receiving the request message. Referring to FIG. 7, in other embodiments, the verification image is an image of a QR code including information of the indication code, the verification code, and the encryption code.

In step S03, the image analysis module 103 analyzes the captured verification image to extract the indication code, the verification code, and the encryption code included in the verification image.

In step S04, the verification code sending module 104 sends the verification code to each of the media providing devices 200 for verification.

In step S05, when the verification code passes a verification of a corresponding media providing device 200, the connection establishing module 105 establishes a media sharing connection between the media requesting device 100 and the corresponding media providing device 200 to share and play streaming media of the corresponding media providing device 200. The streaming media may be a video media and displayed on the first display 13 of the media requesting device 100.

In one embodiment, the connection establishing module 105 exchanges parameters (e.g., format and size) of the shared streaming media with the corresponding media providing device 200 before the media sharing connection is established. When the media sharing connection has been established, the corresponding media providing device 200 transmits the streaming media to the media requesting device 100 in real-time. Thus, the shared streaming media is played by both the media requesting device 100 and the corresponding media providing device 200. In addition, the corresponding media providing device 200 encrypts the shared streaming media using the encryption code, and the media requesting device 100 decrypts the shared streaming media using the encryption code to play the streaming media.

Figure 8:
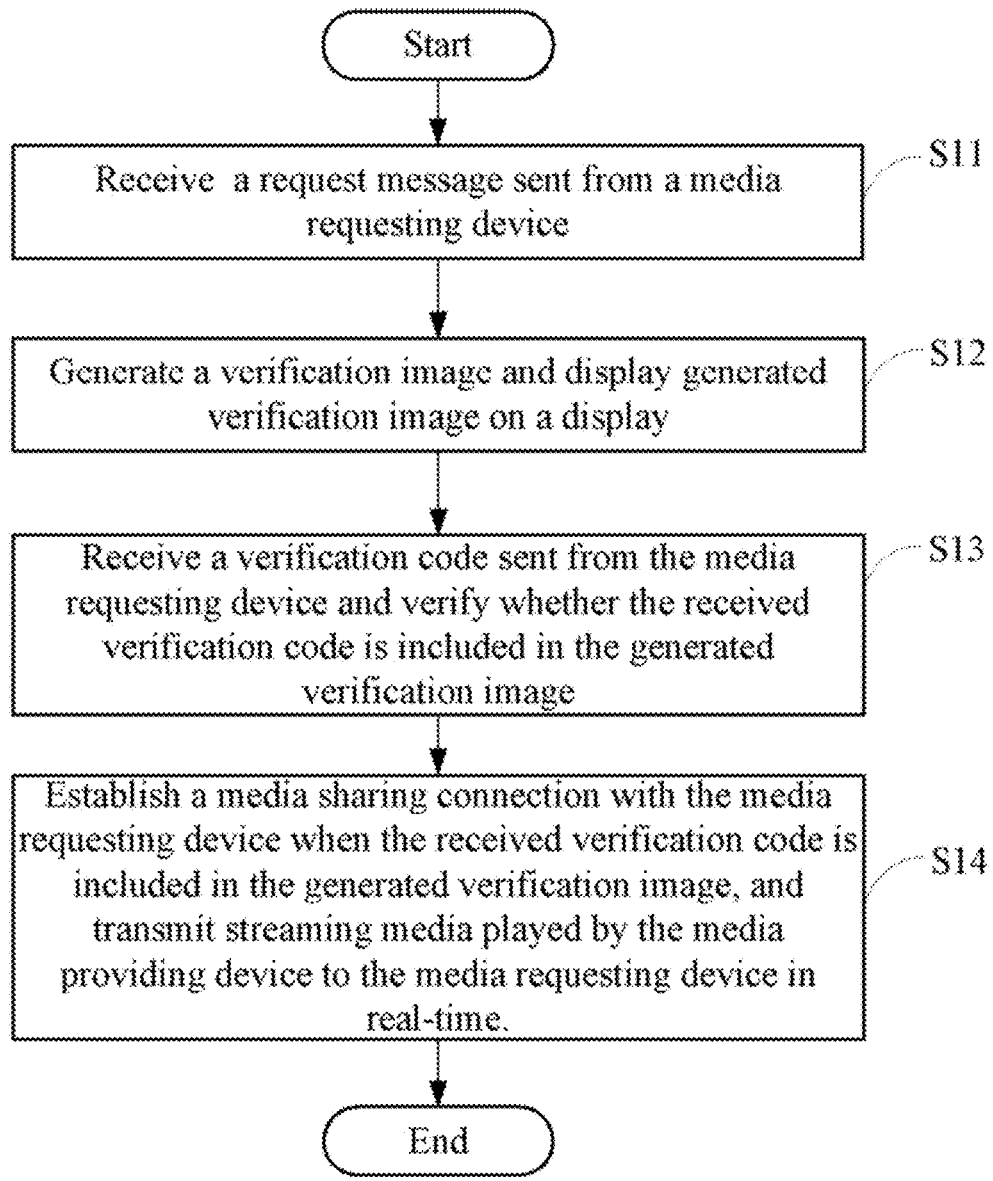
FIG. 8 is a flowchart of a method for the media providing device to provide streaming media to the media requesting device.

FIG. 8 is a flowchart of a method for providing the streaming media for the media requesting device 100 using the function modules of the providing system 20 of the media providing device 200. Depending on the embodiment, additional steps may be added, others removed, and the ordering of the steps may be changed.

In step S11, the request receiving module 201 receives the request message sent from the media requesting device 100.

In step S12, the generation module 202 generates the verification image and displays the verification image in the identification area 230 of the second display 23.

In step S13, the verification module 203 receives the verification code sent from the media requesting device 100 and verifies whether the received verification code is included in the generated verification image.

In step S14, when the received verification code is included in the generated verification image, the media providing module 204 establishes the media sharing connection with the media requesting device 100 and transmits the streaming media to the media requesting device 100 in real-time.

As described above, a media sharing connection between two devices is established using a dynamic verification image. Therefore, it is not necessary for a user to remember information of all the devices within a home media network.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A method of a media requesting device requesting a plurality of media providing devices to sharing streaming media, the media requesting device comprising an image capturing device, the method comprising:
   sending a request message to each of the media providing devices;
   controlling the image capturing device to capture a verification image displayed on a display of one of the media providing devices, the verification image comprising a verification code, wherein the verification image further comprises an indication code and an encryption code;
   extracting the verification code, the indication code and the encryption code from the captured verification image;
   sending the verification code to each of the media providing devices for verification; and
   establishing a media sharing connection with a corresponding media providing device to share and play streaming media of the corresponding media providing device, when the verification code passes a verification of the corresponding media providing device;
   wherein the indication code is a predetermined code which indicates that the request message is used to request to share the streaming media played by the media providing device, the verification code is a random code dynamically generated by the corresponding media providing device, and the encryption code is a preset password used to encrypt and decrypt the streaming media shared between the media requesting device and the corresponding media providing device.

2. The method according to claim 1, wherein each of the media providing devices generates the verification image in response to receiving the request message.

3. The method according to claim 2, wherein the verification image comprises a first barcode having the indication code, a second barcode having the verification code, and a third barcode having the encryption code.

4. The method according to claim 2, wherein the verification image is an image of a QR code comprising information of the indication code, the verification code, and the encryption code.

5. The method according to claim 2, further comprising:
   decrypting the shared streaming media using the encryption code before the shared streaming media is played by the media requesting device.

6. The method according to claim 1, the method further comprising:
   transmitting streaming media played by the media providing device to the media requesting device in real-time when the received verification code is comprised in the generated verification image.

7. A media requesting device in communication with a plurality of media providing devices, comprising:
   an image capturing device;
   a processor; and
   one or more programs executed by the processor, to perform a method of:

sending a request message to each of the media providing devices;

controlling the image capturing device to capture a verification image displayed on a display of one of the media providing devices, the verification image comprising a verification code, wherein the verification image further comprises an indication code and an encryption code;

extracting the verification code, the indication code and the encryption code from the captured verification image;

sending the verification code to each of the media providing devices for verification; and establishing a media sharing connection with a corresponding media providing device to share and play streaming media of the corresponding media providing device, when the verification code passes a verification of the corresponding media providing device;

wherein the indication code is a predetermined code which indicates that the request message is used to request to share the streaming media played by the media providing device, the verification code is a random code dynamically generated by the corresponding media providing device, and the encryption code is a preset password used to encrypt and decrypt the streaming media shared between the media requesting device and the corresponding media providing device.

8. The media requesting device according to claim 7, wherein each of the media providing devices generates the verification image in response to receiving the request message.

9. The media requesting device according to claim 8, wherein the verification image comprises a first barcode having the indication code, a second barcode having the verification code, and a third barcode having the encryption code.

10. The media requesting device according to claim 8, wherein the verification image is an image of a QR code comprising information of the indication code, the verification code, and the encryption code.

11. The media requesting device according to claim 8, wherein the method further comprises:

decrypting the shared streaming media using the encryption code before the shared streaming media is played by the media requesting device.

12. The media providing device according to claim 7, wherein the method further comprises :

transmitting streaming media played by the media providing device to the media requesting device in real-time when the received verification code is comprised in the generated verification image.

13. A media providing device in communication with a media requesting device, comprising:

a display;

a processor; and one or more programs executed by the processor, to perform a method of:

receiving a request message sent from the media requesting device;

generating a verification image and displaying the verification image on the display;

receiving a verification code sent from the media requesting device and verifying whether the received verification code is comprised in the generated verification image; wherein the verification image further comprises an indication code and an encryption code; and establishing a media sharing connection with the media providing device when the received verification code is comprised in the generated verification image, and transmitting streaming media played by the media providing device to the media requesting device in real-time;

wherein the indication code is a predetermined code which indicates that the request message is used to request to share the streaming media played by the media providing device, the verification code comprised in the verification image is a random code dynamically generated by the media providing device, and the encryption code is a preset password which is used to encrypt and decrypt the streaming media shared between the media requesting device and the media providing device.

14. The media providing device according to claim 13, wherein the verification image comprises a first barcode having the indication code, a second barcode having the verification code, and a third barcode having the encryption code.

15. The media providing device according to claim 13, wherein the verification image is an image of a QR code comprising information of the indication code, the verification code, and the encryption code.

16. The media providing device according to claim 13, wherein the display comprises an identification area and the verification image is displayed within the identification area for a predetermined period of time after the request message is received.

* * * * *